US011755955B2

(12) United States Patent
Lange et al.

(10) Patent No.: US 11,755,955 B2
(45) Date of Patent: Sep. 12, 2023

(54) ANOMALY DETECTION AND TUNING RECOMMENDATION SYSTEM

(71) Applicant: Hewlett Packard Enterprise Development LP, Houston, TX (US)

(72) Inventors: Klaus-Dieter Lange, Houston, TX (US); Mukund Kumar, Karnataka (IN); Prateek Bhatnagar, Karnataka (IN); Nalamati Sai Rajesh, Karnataka (IN); Nishant Rawtani, Karnataka (IN); Craig Allan Estepp, Houston, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 103 days.

(21) Appl. No.: 17/225,897

(22) Filed: Apr. 8, 2021

(65) Prior Publication Data
US 2021/0406146 A1 Dec. 30, 2021

(30) Foreign Application Priority Data
Jun. 24, 2020 (IN) .............................. 202041026767

(51) Int. Cl.
*G06N 20/00* (2019.01)
*G06F 11/30* (2006.01)
*G06F 11/32* (2006.01)
*G06F 11/34* (2006.01)
*G06F 18/214* (2023.01)

(52) U.S. Cl.
CPC ......... *G06N 20/00* (2019.01); *G06F 11/3006* (2013.01); *G06F 11/3075* (2013.01); *G06F 11/327* (2013.01); *G06F 11/3428* (2013.01); *G06F 18/214* (2023.01)

(58) Field of Classification Search
CPC ............. G06F 11/3428; G06F 11/3006; G06F 11/327; G06F 11/3447; G06F 2201/81; G06F 2201/88; G06N 20/00
See application file for complete search history.

(56) References Cited

U.S. PATENT DOCUMENTS 10,102,098 B2 10/2018 Yeh et al.
10,257,275 B1 4/2019 Dirac et al.
(Continued)

OTHER PUBLICATIONS

Abbas et al., "Hardware Performance Counters based Runtime Anomaly Detection using SVM", TRON Forum, Conference Paper, Dec. 2017, 10 pages.
(Continued)

*Primary Examiner* — Manuel L Barbee
(74) *Attorney, Agent, or Firm* — Sheppard Mullin Richter & Hampton LLP

(57) ABSTRACT

Systems and methods are provided for detecting anomalies on multiple layers of a computer system, such as a compute server. For example, the system can detect anomalies from the lower firmware layer up to the upper application layer of the compute server. The system collects train data from the computer system that is under testing. The train data includes features that affect performance metrics, as defined by a selected benchmark. This train data is used in training machine learning (ML) models. The ML models create a train snapshot corresponding to the selected benchmark. Additionally with every new release, a test snapshot can be created corresponding to the selected benchmark or workload. The system can detect an anomaly based on the train snapshot and the test snapshot. Also, the system can recommend tunings for a best set of features based upon data collected over generations of compute server.

15 Claims, 7 Drawing Sheets

(56) References Cited

U.S. PATENT DOCUMENTS

| | | |
|---|---|---|
| 10,332,027 B2 | 6/2019 | Arguelles |
| 2019/0057006 A1 | 2/2019 | Boyapalle et al. |
| 2021/0117977 A1* | 4/2021 | Kim ........................ G06F 17/15 |
| 2021/0374027 A1* | 12/2021 | Joglekar ............. G06F 11/3072 |

OTHER PUBLICATIONS

Choudhary, Pramit, "Introduction to Anomaly Detection", Oracle AI & Data Science Blog, available online at <https://blogs.oracle.com/ai-and-datascience/post/introduction-to-anomaly-detection>, Feb. 15, 2017, 12 pages.

HPE, "HPE ProLiant Shatters 37 world Records", Press Release, Aug. 7, 2019, 11 pages.

Wikipedia, "Kalman Filter", available online <https://en.wikipedia.org/w/index.php?title=Kalman_filter&oldid=988879603>, Nov. 15, 2020, 36 pages.

Wikipedia, "Multivariate Normal Distribution", available online at <https://en.wikipedia.org/w/index.php?title=Multivariate_normal_distribution&oldid=997473089>, Dec. 31, 2020, 18 pages.

Wikipedia, "Probability Density Function", available online at <https://en.wikipedia.org/w/index.php?title=Probability_density_function&oldid=992480413>, Dec. 5, 2020, 9 pages.

Wikipedia, "Recursive Bayesian Estimation", available online at <https://en.wikipedia.org/w/index.php?title=Recursive_Bayesian_estimation&oldid=976768565>, Sep. 4, 2020, 4 pages.

* cited by examiner

400

TRAIN DATA FOR FIRMWARE COUNTER

| THERMAL_CONFIGURATION_MAX COOLING | THERMAL_CONFIGURATION_OPTIMALCOOLING | HYPERTHREADING_ENABLED | HYPERTHREADING_DISABLED | BENCHMARK PERFORMANCE METRICS |
|---|---|---|---|---|
| 1 | 0 | 1 | 0 | 12 |
| 0 | 1 | 1 | 0 | 10 |
| 1 | 0 | 0 | 1 | 9.5 |

COUNTER WEIGHTS AND RANKING

| COUNTERS | WEIGHTS | RANKINGS |
|---|---|---|
| THERMAL_CONFIGURATION_MAXCOOLING | 0.334 | 2 |
| THERMAL_CONFIGURATION_OPTIMALCOOLING | 0.102 | 3 |
| HYPERTHREADING_ENABLED | 0.514 | 1 |
| HYPERTHREADING_DISABLED | 0.050 | 4 |

FIG. 4

ANOMALY DETECTION AND TUNING RECOMMENDATION SYSTEM

CROSS REFERENCE TO RELATED APPLICATIONS

This application claims the priority benefit of IN Patent Application No. 202041026767, filed on Jun. 24, 2020, which is incorporated herein by reference in its entirety.

DESCRIPTION OF RELATED ART

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 depicts an example of a firmware snapshot that may be generated by the anomaly detection and tuning recommendation system shown in FIG. 2, according to embodiments of the disclosed technology.

Figure 1:
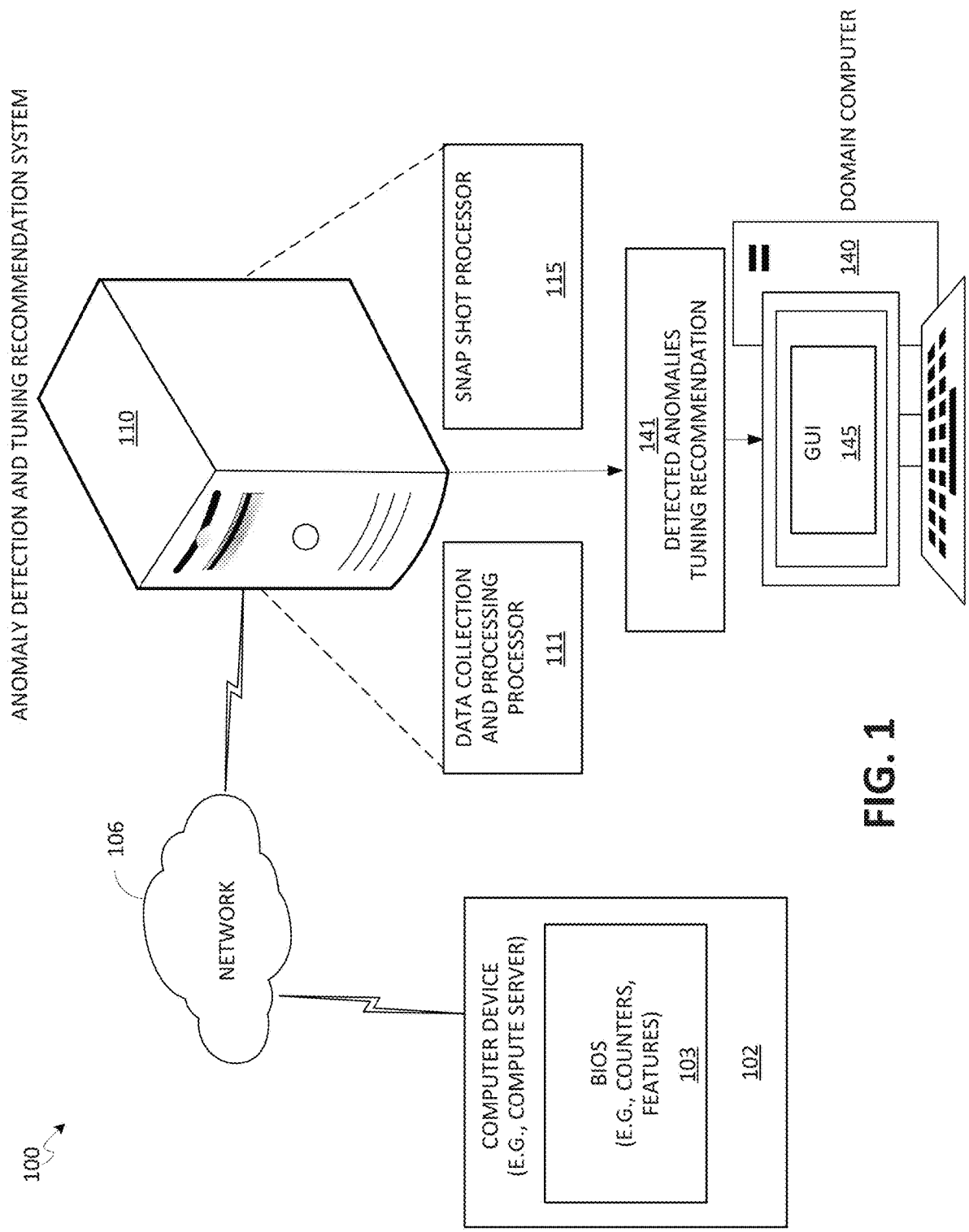
FIG. 1 illustrates an example of a network configuration that may be used in operating an anomaly detection and tuning recommendation system, according to embodiments of the disclosed technology.

The figures are not exhaustive and do not limit the present disclosure to the precise form disclosed.

DETAILED DESCRIPTION

The present disclosure describes technology that identifies anomalies related to the performance of a computer system from its Basic Input/Output System (BIOS) level (e.g., low level) to its application level (e.g., upper level). With continuous innovation that is emerging across the infrastructure of data centers, compute servers also continue to evolve (e.g., increased processing power). For example, later generations of compute servers can introduce a gamut of parameters and/or counters at different system levels, such as memory configuration, storage options, Operating System (OS) tunings, Java Virtual Machine (JVM) options, and compiler flags. These different parameters can undergo rapid transformation during the development of computer products, such as the server.

As an example, in a short time period (e.g., 5-6 months) multiple firmware releases for a compute server can be distributed. With every release of firmware (or hardware, OS, etc.) new counters can get introduced, modified, removed, or a combination of these. Each of these scenarios may require additional measurements of their impact on performance and power efficiency on the compute server. However, measuring performance with respect to each may lead to a number of problems.

For instance, in considering measuring and tuning an industry-standard benchmark, with the introduction of the new counters (e.g., for every firmware release or any other parameters' new releases at different system level like OS, JVM etc.) it may be difficult for an engineer to manually find the right combination of counters and their respective features which impacts the score of its respective industry-standard benchmark (e.g., SPEC CPU 2017, SPECjbb2015). As referred to herein, counters are the various tunable parameter associated with a release of firmware (or hardware, OS, BIOS, etc.). For example, in BIOS "Thermal Configuration" is one of the tunable parameters. Features, as referred to herein, can be the exact configuration of the tunable parameter (or counter). For example, the counter "Thermal Configuration" can have two features namely "Maximum Cooling" or "Optimal Cooling."

Furthermore, new bugs and other types of anomalies may be introduced with each new release of firmware (or hardware, OS, JVM etc.). Often, these new anomalies, may not be recognized early enough in the development cycle. This can lead to quality issues in the computer product, and if identified at a later stage, can cause losses to the organization or customer escalations at an even larger scale. These types of changes can influence the overall benchmark score and may require a large engineering effort to identify the performance impacts associated with the various releases (e.g., including the addition or removal of counters).

According to the disclosed anomaly detection techniques, the abovementioned problems of: 1) finding the right combination of counters with respective feature set; and 2) detecting the anomalies early in the lifecycle—are solved by Artificial Intelligence (AI) and Machine Learning (ML) algorithms. Typically, AI/ML approaches may require large amount of train data. Furthermore, training an ML model can be a very timing consuming process, especially in this scenario with every set of new counters being introduced at every new generational releases of firmware (or OS, JVM, etc.). Accordingly, the disclosed anomaly detection techniques address the existing need to use the train data collected for an ML model to fit with the new counter sets added with new releases, and thereby pushing back the phase of collection of data (run combinations) (which usually takes months/years considering the wide range of counters and respective features available in the market).

The anomaly detection system and techniques, as disclosed herein, allow for automatically revealing anomalies across various system stacks (e.g., firmware, hardware, OS etc.) and automatically tuning these based upon the server telemetry data collected during industry-standard benchmark or any workload measurements. As described in detail with reference to FIG. 1 (and throughout the disclosure), the anomaly detection and tuning recommendation system 110 includes a framework that simplifies the anomaly detection and tuning recommendation process for the continuously evolving hardware, firmware, software stack of computer systems (e.g., compute devices). Particularly, the anomaly detection and tuning recommendation system 110 leverages Machine Learning (ML) techniques. For example, the system 110 employs an anomaly detection method that can gradually learn the characteristics of newly added features of the compute devices, in order to predict anomalies and provide tuning recommendations without repeating the training effort of the ML model. Further, the anomaly detection and tuning recommendation system 110 can automatically request an intervention from a domain expert to make the decision in certain instances.

Before describing embodiments of the disclosed anomaly detection and tuning recommendation system 110 in detail, it is useful to describe an example distributed network system 100 with which the disclosed systems and methods might be implemented in various applications. FIG. 1 illustrates an example of a network configuration 100 that may be implemented for using the anomaly detection and tuning recommendation system 110.

Referring now to FIG. 1, the network configuration 100 in shown to include: a computer device 102; the anomaly detection and tuning recommendation system 110; and a domain computer 140. In FIG. 1, the computer device 102 is shown as a compute server. For example, as a computer server, the computer device 102 can be specifically designed to undertake large amounts of computation in a client/server environment, such as a data center. In some embodiments, the computer device 102 can be implemented as another type of computer device other than a compute server, which is capable of performing computations and running software applications, for example.

The computer device 102 can have a layered organization, which each higher layer either using the services of, or being physically built from, entities on the lower level directly below it. As an example, the computer device 102 can have a software layer structure that includes (in ascending order): the I/O System or BIOS level; the OS level; the system utility level; and the application level. FIG. 1 illustrates the computer device's 102 and its BIOS 103 at the lower level of the software layer structure. As referred to herein, the BIOS 103 is firmware used to perform hardware initialization during the booting process (power-on startup), and to provide runtime services for operating systems and programs. The BIOS 103 (or firmware) can be associated with counters and features that may unique to a certain release version, as alluded to above. Furthermore, in some cases, the BIOS 103 may have bugs and other anomalies that impact performance. Accordingly, the anomaly detection and tuning recommendation system 110 can execute a process to search for such performance anomalies as a part of testing the computer device's 102 software and/or hardware. Testing can be an important process in the product development lifecycle. Testing can help to safeguard against potential failures that may prove to be detrimental to the overall function of the computer product (e.g., software application, firmware, BIOS, or hardware), namely the computer device 102, which ultimately impacts customer satisfaction. Often, software testing is a planned process, in which an overall threshold and risks associated with the implementation of the product, in this case the BIOS 103, is assessed and analyzed under certain conditions. The anomaly detection and tuning recommendation system 110 can be a computer system (e.g., centralized server, workstation, home server) that is programmed to automatically run tests, for example using industry-standard benchmarks, for the purpose of detecting anomalies related to the computer 102 and its BIOS 103.

In the illustrated example, a communication network 106 establishes communicative connections between the computer device 102, the anomaly detection and tuning recommendation system 110, and the domain computer 140 in manner that allows these devices to communicate, for instance sharing data and/or instructions there between. Accordingly, the anomaly detection and tuning recommendation system 110 may be operable to configure and manage the testing of the computer system 102 at a remote site (with respect to the system 110) via its connection to the network 106. In this case, the communication network 106 can be a Wide Area Network (WAN), such as the Internet. For example, the system 110 can collect test data from the computer system 102 and transmit test-related commands to the computer system 102, both of which are communicated across the network 106. Alternatively, the anomaly detection and tuning system 110 can be local to the computer device 102. For example, the anomaly detection and tuning recommendation system 110 can establish a wired connection to the computer device 102 via a physical connector, such as USB cable. Also, the anomaly detection and tuning system 110 can establish a wireless connection to the computer device 102 via the communication network 106, such as a local area network (LAN). Examples of devices that can be used to implement the anomaly detection and tuning recommendation system 110 can include: desktop computers; laptop computers; servers; web servers; authentication servers; network servers; domain servers; cloud servers; backend servers; mainframes; tablet computers; netbook computers; personal digital assistants (PDAs); mobile phones; smart phones; smart terminals; virtual terminals; Internet of Things (IOT) devices, and the like.

In FIG. 1, the anomaly detection and tuning recommendation system 110 includes a data collection and processing processor 111 and a snapshot processor 115. As a general description, the data collection and processing processor 111 collects train data from the computer system 102, which can then be used by the snapshot processor 115 to generate snapshots. For example, the snapshot processor 115 can create a snapshot using the train data that reflects a previous release's current state snapshot, also referred to herein as a previous state snapshot. Furthermore, the anomaly detection and tuning recommendation system 110 uses ML techniques that leverage the train data (collected by the data collection and processing processor 111) and the snapshots (created by snapshot processor 115) to automatically detect anomalies in the feature set from the BIOS level up to the application level of a tested device, such as computer device 102. The anomaly detection and tuning recommendation system 110 achieves this automated anomaly detection by learning the characteristics of newly added features (e.g., included in new BIOS releases) using the aforementioned snapshots. Furthermore, the anomaly detection and tuning recommendation system 110 can recommend a "best set" of features for tuning. For instance, the tuning can be based on the telemetry data collected from the computer device 102 during industry-standard benchmark or any workload measurements. The anomaly detection and tuning recommendation system 110 can be trained to identify the associated performance impacts of the current BIOS 103 release that is installed on the computer system 102 on industry-standard benchmarks.

The data collection and processing processor 111 and the snapshot processor 115 can be implemented via a combination of hardware, software, and/or firmware that is configured to work in concert to provide the anomaly detection and tuning recommendation techniques disclose herein. The automation framework is a multi-benchmark platform where the user is able to conduct a benchmark run on its chosen hardware platform. The anomaly detection and tuning recommendation techniques that are implemented by the system 110 are disclosed in greater detail in reference to FIGS. 3A-3B below. By implementing these techniques, the anomaly detection and tuning recommendation system 110 generates results that can be output and communicated to a domain computer 140. As seen in FIG. 1, the anomaly detection and tuning recommendation system 110 can output an indication of detected anomalies and tuning recommendations 141.

Also, FIG. 1 shows that the system 100 can include a domain computer 140. The domain computer 140 can include a graphical user interface (GUI) 145. In some cases, the domain computer 140 is associated with a user that is skilled or otherwise knowledgeable regarding compute performance metrics, such as a domain expert. Accordingly, the (GUI) 145 can display data and visual representations (e.g., results, etc.) related to the detected anomalies and tuning recommendation 141 that is communicated from the anomaly detection and tuning recommendation system 110. For instance, insights from the detected anomalies and tuning recommendation 141 are used by the domain expert for further investigation regarding identifying the performance impacts associated with adding or removing of counters for a certain BIOS release and a best performance configuration. Additionally, the GUI 145 can receive various user-configurable parameters entered by a user, such as the domain expert, that are used by the system 110 while executing the anomaly detection and tuning techniques. As illustrated in FIG. 1, the domain computer 140 can receive tuning recommendations 141 as an output generated by the anomaly detection and tuning recommendation system 110. Therefore, the embodiments can provide the user with the capability to dynamically adapt the test to optimize the process, during testing. Thus, the system 100 provides additionally flexibility to allow for human-intervention in the automation, when deemed necessary. Alternatively, the system 100 can be configured to automatically execute any tuning recommendations 141 produced by the anomaly detection and tuning recommendation system 110, such that the level of automation in the testing process is maximized.

Figure 2:
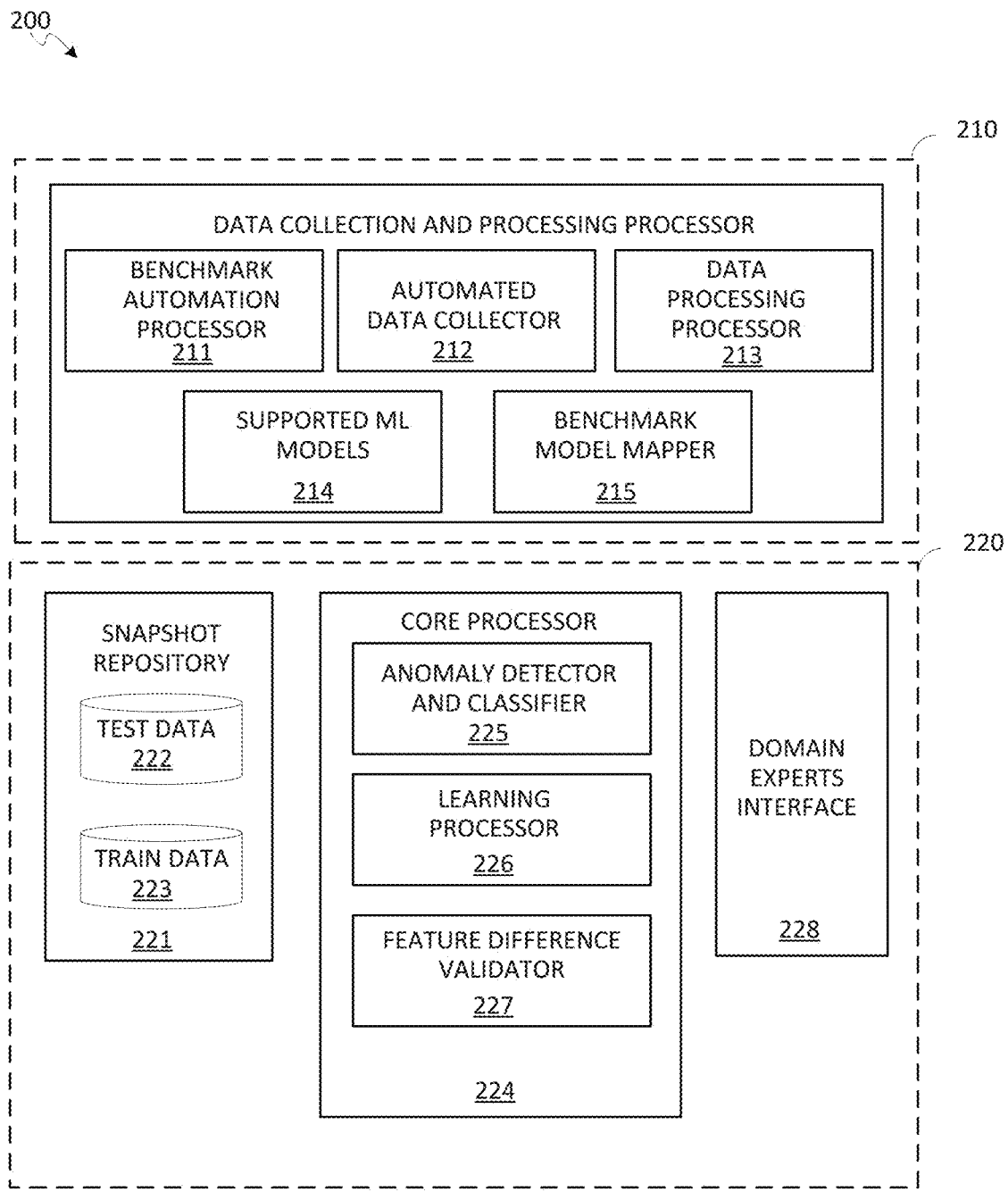
FIG. 2 depicts an example of a system architecture for the anomaly detection and tuning recommendation system shown in FIG. 1, according to embodiments of the disclosed technology.

FIG. 2 shows an example of a system architecture of the anomaly detection and tuning recommendation system 200, as disclosed herein, in detail. As seen in FIG. 2, the system 200 comprises several internal components in its system architecture that include a data collection and processing component 210 comprising: benchmark automation processor 211; automated data collector 212; data processing processor 213; and supported ML models 214 and a snapshot component 220 comprising: benchmark model mapper 215; core processor 224; snapshot repository 221; and domain experts interface 228. These aforementioned components of the system 200 can be implemented as a combination of hardware, software, and/or firmware that is configured to work together to provide the anomaly detection and tuning recommendation techniques disclose herein. The benchmark automation processor 211 is configured to generate random combinations of all of the listed features and schedules runs for every benchmark to be used to collect data. The automated data collector 212 is configured to automatically collect telemetry data from the computer system under test during the benchmark runs. According to the embodiments, the data collected by the automated data collector 212 is used as train data for training the ML models and further for generating snapshots. In some embodiments, the automated data collector 212 collects the data in a platform agnostic manner. Data processing processor 213 is configured to modify the collected data by the automated data collector 212 from the benchmark run. The data processing processor 213 can structure this data into a data set, which is in a format that can be used as training input for a suitable ML model. For instance, the data processing processor 213 may convert collected data into a common readable format.

Also, the system 200 can store, or otherwise maintain, a set a supported ML models 214. The set of ML models 214 includes several supervised machine-learning models. As referred to herein, AI can be described as automated computer processes that can intelligently leverage data analysis for training itself for further optimizing the processes. ML can be generally considered an application of AI. AI/ML techniques can include various approaches that are used in the area to achieve automated data analysis, such as neural networks, text analysis, and so on. Accordingly, the ML models 214 are mathematical models that are built using ML algorithms based on sample data, or train data, in order to make predictions or decisions without being explicitly programmed to do so. The benchmark model mapper 215 is configured to apply the processed data from the data processing processor 213 to the set of ML models 214 in order to identify which model is a "best fit" for each benchmark by minimizing the loss.

Figure 5:
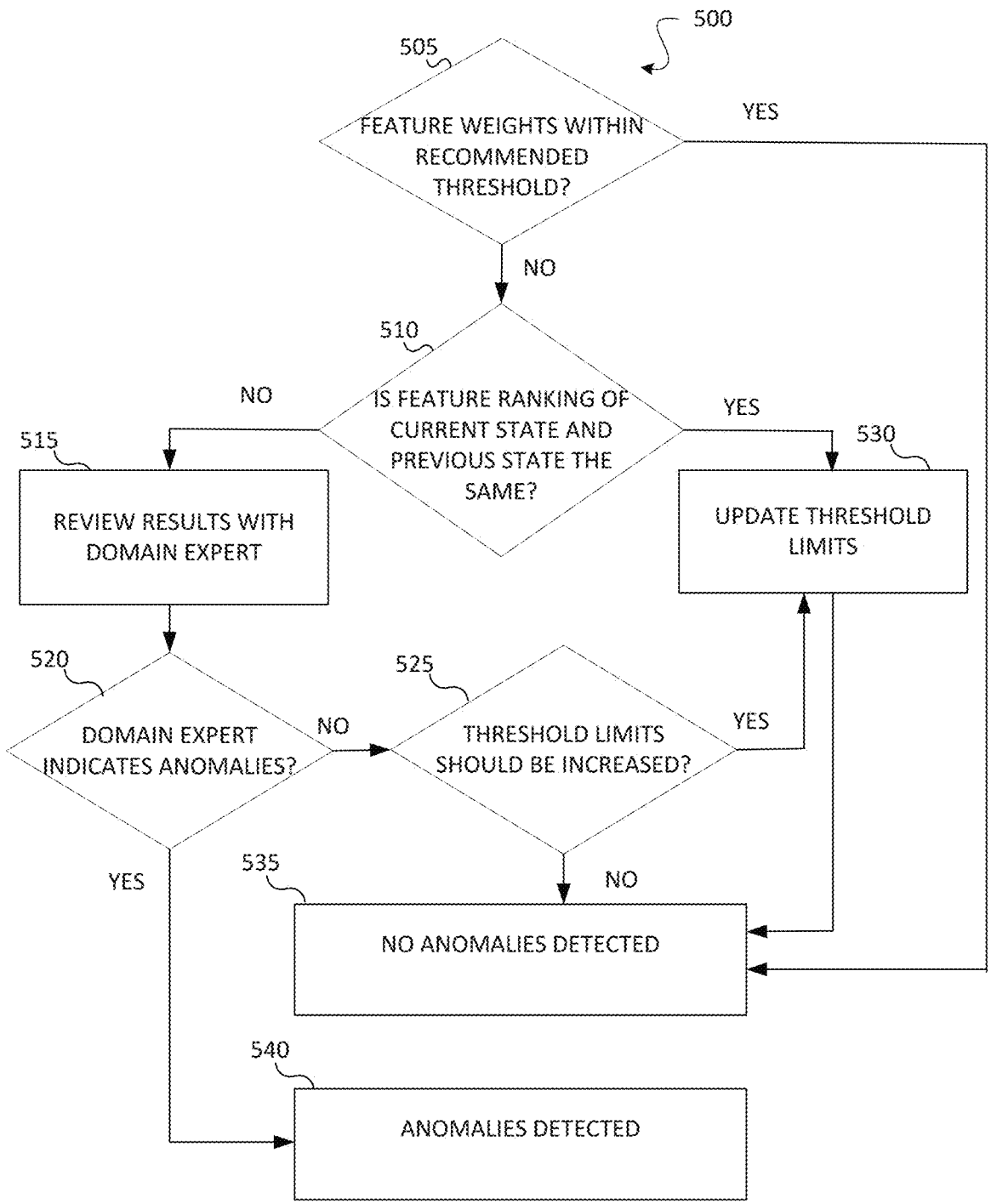
FIG. 5 is a flow diagram illustrating an example process implemented by an anomaly detector and classifier of the system shown in FIG. 2, according to embodiments of the disclosed technology.

The core processor 224 can be considered a central component of the system 200, encompassing several sub-components that implement the anomaly detection aspects (including a predict phase and update phase) of the system's capabilities. In the example, the system 200 includes: an anomaly detector and classifier 225; a learning processor 226; and a feature difference validator 227. As a general description, the anomaly detector and classifier 225 is a rule-based engine which detects performance anomalies and classifies them as either point anomalies or collective anomalies. The anomaly detector and classifier 225 is configured to analyze snapshots to detect anomalies and classify them using an algorithm that is depicted in FIG. 5. In a predict phase (described in detail in reference to FIGS. 3A-3B) the anomaly detector and classifier 225 verifies a transition state snapshot with respect to a snapshot from a previous state by checking whether the features' ranks and weights are within a recommended threshold.

As seen in FIG. 2, the core processor 224 includes the learning processor 226. The learning processor 226 is configured to receive snapshots in order to smooth a previous state snapshot by looking at an incoming new transition state snapshot with the recent release. In some embodiments, the learning processor 226 comprises two sub-components—a probability density function (PDF) maximizer and an adjusted previous state snapshot (not shown). The PDF maximizer derives PDFs of a previous state and a transition state from the new transition state snapshot and the previous state snapshot. The PDF also identifies the distribution of previous states (associated with train snapshots) and current states (associated with test snapshots) based on features' weight and ranks obtained from ML model. In an update phase of the disclosed techniques, the learning processor 226 modifies the previous state snapshot, making it more robust using the new transition state snapshot. As will be described in detail below, the learning processor 226 can be configured to using an algorithm based upon a Bayesian Model approach. For example, the algorithm can employ the recursive Bayesian estimation model as reference, which incorporates the new transition state (associated with test snapshot) related changes from a new generation release to the existing current state (associated with train snapshot) by maximizing this probability density function. According to the embodiments, this process implemented by the learning processor 226 operates in a manner that reduces the retraining effort.

The feature difference validator 227 is configured to validate a counters' feature to detect if there has been an addition, removal, or modification (or any combination of the three)) of counters and/or features with a BIOS recent release. By identifying these differences, it can be further predicted whether anomalies related to these changes may exist. The core processor 224 can also include a domain expert interface 228. The domain expert interface 228 enables interactions between a user, namely a domain expert, and the system 200 as described in detail above. As an example, the domain expert interface 228 can be a GUI which allows the domain expert to enter input that flags detected anomalies as point anomalies or collective anomalies for classification. Thus, the domain expert interface 228 provides a way to incorporate human based input in some cases. The inputs from the domain expert interface 228 can be also used in order to reduce the retraining effort.

The system 200 further includes a snapshot repository 221. The snapshot repository 221 can be a storage device (or system) storing snapshots and related data. As shown in FIG. 2, the snapshot repository 221 can maintain test data database 222 and train data database 223. The snapshot repository 221 can store this data in manner that allows the data to be maintained locally by the system 200 and retrieved by other components of the system 200, as needed. The snapshot repository 221 can store snapshots for every benchmark (or workload) which contains the BIOS' (or firmware, hardware, OS, individual benchmark/workload, etc.) counter's ranks based on the weight of their coefficients (which are derived from the respective ML model). The snapshot repository 221 enables the system 200 to compare the features across (or within) product generations, for example various releases of the BIOS. Moreover, a current state snapshot can be created for every benchmark (or workload) that is used for recommending a best tuning for respective benchmarks. This type of snapshot, which is based on data structure, enables the system to improve its predictions on the fly.

Accordingly, the architecture in FIG. 2 enables the anomaly detection and tuning system 200 to automatically detect anomalies across various system stacks (BIOS, firmware, hardware, OS etc.) from the lower BIOS level to the upper application level of the computer system that is being tested.

Figure 3A:
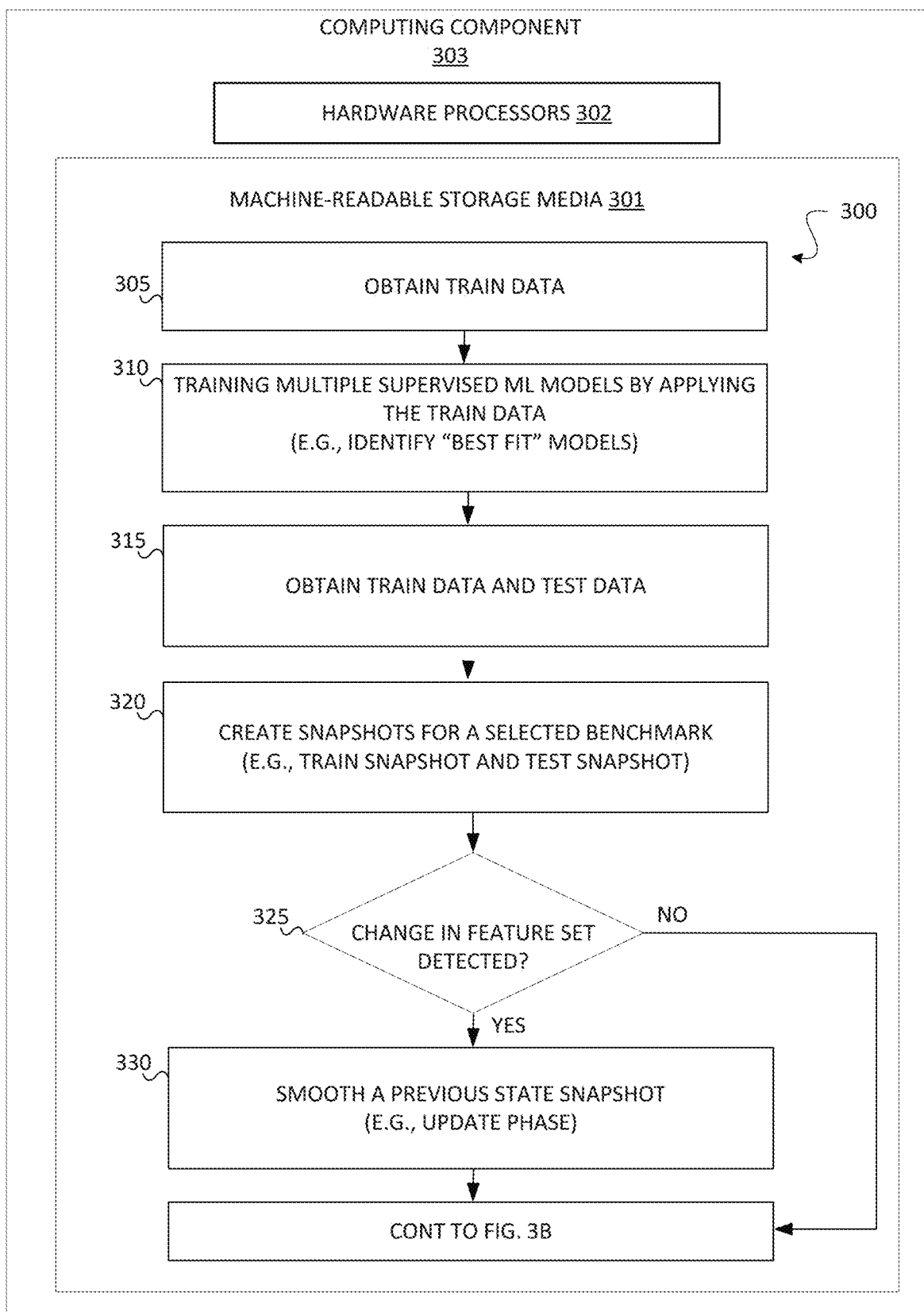
FIGS. 3A-3B are a flow diagram illustrating an example process for implementing the disclosed anomaly detection and tuning recommendation techniques, according to embodiments of the disclosed technology.
Figure 3B:
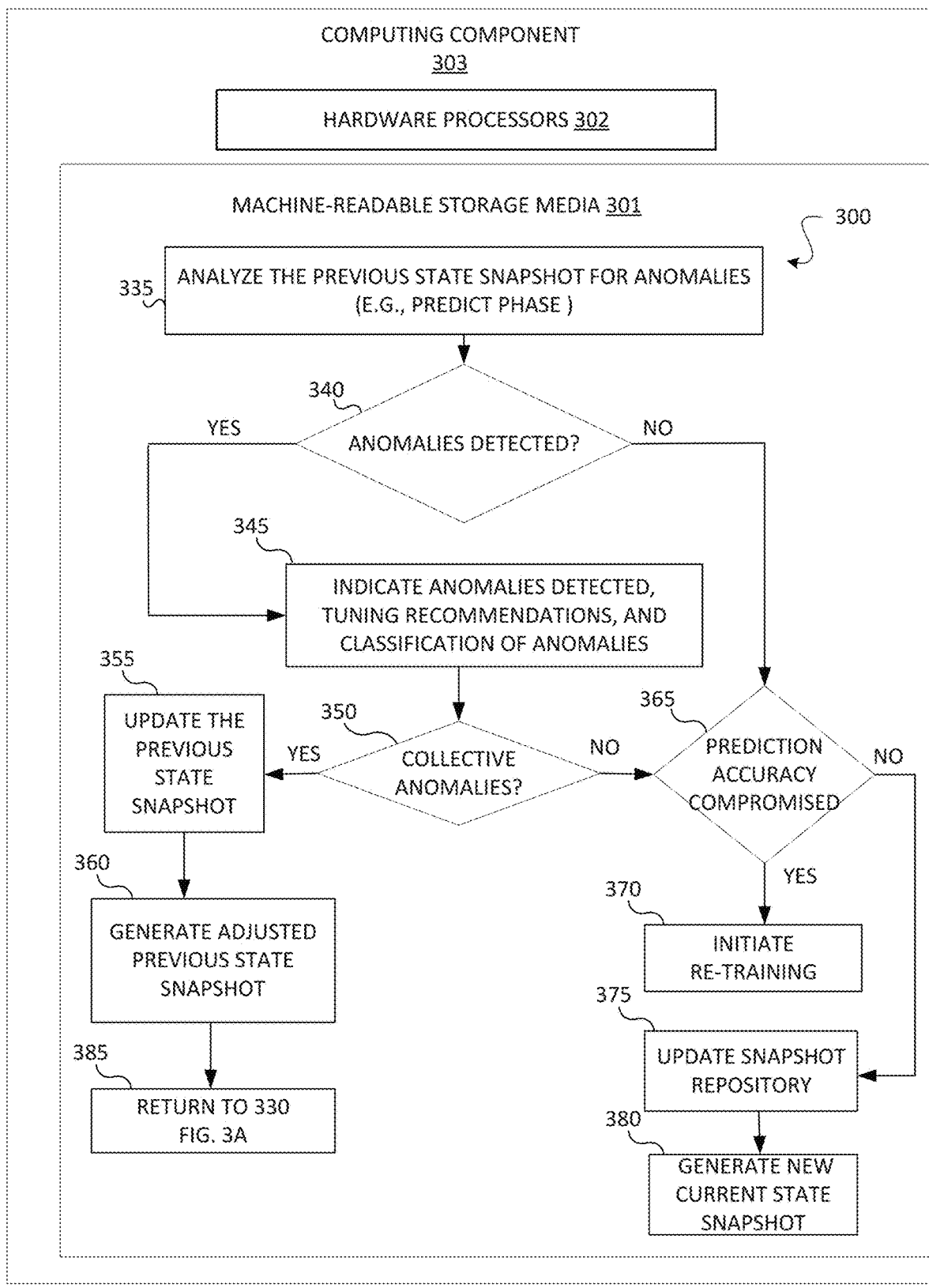

Further details of the anomaly detection and tuning recommendation methods are now described with reference to FIGS. 3A-3B. An example of a process 300 according to an embodiment of the systems and methods described herein, is illustrated in FIGS. 3A-3B. As seen in FIG. 3A-3B, process 300 is illustrated as a series of executable operations in a machine-readable storage media 301 performed by a hardware processor 302. The computing component 303 can be the server implementing the anomaly detection and tuning recommendation system (shown in FIG. 1), as previously described.

Referring to FIG. 3A, the process 300 begins at operation 305. During operation 305, train data can be obtained from a computer system that is under testing, particularly for detecting performance anomalies. As alluded to above, a compute server is an example of a computer system that is tested by process 300, ultimately for detecting performance anomalies. Generally, operation 305 involves collecting the train data associated with a current release that is installed on the computer system (e.g., BIOS, firmware, hardware, OS et.) and its associated counters. The train data can include counters from a BIOS (or firmware, hardware, OS, etc.) and individual benchmarks. The benchmarks can contain features that are affecting the performance metrics (target), as defined by specific benchmark. In some cases, the benchmarks are industry standard benchmarks. As an example, a firmware counter named "Thermal Configuration" can be set to a value of "Maximum Cooling, Optimal Cooling," and another firmware counter named "Memory Patrol Scrubbing" can be set to a value "Disabled/Enabled."

The system can be configured to use a benchmark automation technique in order to generate various random combinations of all the listed features and schedules runs for every benchmark which is used to collect data in operation 305. The random combinations can be generated using a custom defined script in order to ensure that the final data generated is not biased.

Operation 305 can include modifying the collected train data from the benchmark run, and structuring this data into a data set, which can be fed into any suitable ML model. The train data can be collected in a platform agnostic manner, for example by converting it into a common readable format. In other words, the train data is in a format that is irrespective of the particular BIOS, OS, hardware platform, and the like.

Next, at operation 310, the train data (from previous operation 305) is applied to multiple supervised ML models in order to train the ML models. Operation 310 can be referred to as an initial training stage of process 300. By employing several ML models, the model that is a "best fit", or otherwise fits well for each benchmark, can be identified as a result of operation 310. A "best fit" model may be characterized as a ML model that minimizes the loss (i.e., having the best accuracy) while predicting the associated performance metrics of the respective benchmarks. In some cases, operation 310 can involve using new ML models, and improving existing ML models. Anomalies existing during the initial train state of operation 310 will be identified at a later stage in process 300, when the fixes for these anomalies have been provided. Accordingly, this initial training stage for the ML model(s) needs to be performed only once per generation release, which realizes advantages over some existing ML approaches that may require multiple training cycles (per release) (e.g., increasing latency, and consuming larger amounts of processing resources). Thereafter, process 300 proceeds to operation 315.

At operation 315, test data and train data can be obtained. The train data can be obtained from previous operation 310. In a scenario where the initial training stage has already been performed, for a prior release, the train data can be obtained from a previous state of the computer system. With every new release of BIOS (or firmware, OS, hardware, etc.) test data, which comprises the available counters, can be collected for every benchmark. Thus, the test data can also be obtained in operation 315. Once the train data and the test data are obtained, this data is subsequently processed by process 300.

Next, at operation 320, after the "best fit" models are identified in previous operation 310, snapshots can be created for a selected benchmark. Snapshots can be created using either train data or test data that is obtained in previous operation 315. A snapshot, as referred to herein, is as a point-in-time image containing train data and/or test data for counters from a BIOS (or firmware, hardware, OS, etc.) corresponding to a particular release cycle, together with weight and rankings of these counters based on their performance impact made towards the benchmarks. FIG. 4 depicts an example of a train snapshot 400 for firmware counters for a benchmark that may be generated during operation 320. The train snapshot for a benchmark, at a given time, will be defined for only one entity, such as the BIOS or the firmware. The counter's rank (shown in FIG. 4) can be based on the weight of their feature's coefficients, which are derived from the identified ML model. As seen in FIG. 4, the train snapshot 400 includes the ranks and weights of all the counters. Therefore, a train snapshot generated in operation 320 can be used to recommend the best tunes for the chosen entity for the specific benchmarks by analyzing the ranks of the associated counters. The train snapshot, including the train data, becomes a reflection of the current state of the computer device. The current state of a computer device can be considered as the related information that is in the snapshot, at a particular instant (e.g., firmware release date). In other words, the train snapshot (derived from the train data) serves as a snapshot of the current state.

Additionally, operation 320 includes creating a test snapshot based on the test data previously obtained in operation 315. A test snapshot can be derived from this test data by applying test data to the same ML model that was identified for each benchmark before, in operation 310. This test snapshot, then becomes the new transition state for the computer device. Thus, after operation 310, the test snapshot serves as the new transition state snapshot (derived from the test data). Also, the previous release's current state snapshot (derived from train data) becomes a previous state snapshot. Thereafter, the process moves to operation 325.

Operation 325 can involve a check to determine whether any changes in the feature set have been detected between the previous release's current state and the new transition state, which can be associated with a new release of the BIOS. This determination can be made by analyzing the new transition state snapshot (test data based) and the previous state snapshot (train data based), which have been created in the preceding operation 320. Features of the counters, which are included in the respective snapshots, can be validated in order to detect if there has been an addition and/or removal of new or existing features (or counters) with this recent releases. If there are changes in the feature sets detected with the recent release ("Yes"), then both the new transition state snapshot (derived from test data) and the previous state snapshot (derived from train data) are fed to the learning engine in operation 330 to smooth the previous state snapshot by analyzing the incoming new transition state snapshot with the recent release. Operation 330 can be considered the update phase of process 300, which will be discussed in further detail below.

At operation 330, the previous state of the computer system (associated with train data) that is collected across the BIOS (or firmware, OS, hardware platform, etc.) can be leveraged in order to minimize the effort of collecting train data by smoothing this train data. As referred to herein, smoothing is the process of estimating past values given past and current observations. According to the embodiments, smoothing can employ the Recursive Bayesian Estimation model. For example, the Recursive Bayesian Estimation model smooths the previous state train data by observing the current state (test data) that has been collected for the new releases across the BIOS (or firmware, OS, hardware platform, etc.). Accordingly, the changes in the existing train data and its effect on the performance metrics of the benchmarks can be continuously incorporated with the addition and/or removal of new (or existing) counters. By smoothing the train data in operation 330, the amount of effort related to collecting train data and building the ML model from scratch with every generational release that may include addition and/or removal of new (or existing) counters can be minimized, thereby enhancing the process 300 (e.g., reduced latency).

As background, Recursive Bayesian estimation consists of two parts: predict and update. Predict phase involves estimating a current state using the produced estimates from the previous state. As previously described, train data comprises counters from the BIOS (e.g., firmware, hardware, OS, etc.), and the individual benchmarks that include all the features with benchmark performance metric. The train data can be is considered a multivariate normal distribution. Further, this distribution can be represented through a Probability Density Function (PDF) which is also known as a density of a continuous random variable (benchmark performance metric). The function, whose value for any given sample in the sample space (train data) can be interpreted as providing a relative likelihood that the value of the random variable would equal to that sample. The PDF can be derived from a regression model using ML algorithms. Thus, operation 330 can involve maximizing the PDF.

The linear regression model between the counters and performance metrics (target) for the benchmarks can be represented mathematically as:

$$Y = mX + C \tag{1}$$

where X are the train data points consisting of a set of counters,
Y is the performance metrics (target), and
C are the parameters of the model.

The parameters (m, C) define a blueprint of the model. For instance, when specific values are chosen for these parameters, then the ML model for predicting targets (Y) converges (fits the model). Furthermore, a multivariate normal (Gaussian) distribution can have two parameters including the mean (μ), and the standard deviation (σ). If the curve for normal distribution is drawn, different values of mean and standard deviation will result in different curves. The aforementioned model parameters (m, C) chosen appropriately allows the process 300 to arrive at the exact mean and the standard deviation for our multi-variate random continuous variable (performance metric for the benchmark) and represents its normal distribution through the PDF.

The PDF for a normal (Gaussian) distribution can be represented mathematically as:

$$P(x; \mu, \sigma) = \frac{1}{\sigma\sqrt{2\pi}} \exp\left(-\frac{(x-\mu)^2}{2\sigma 2}\right) \tag{2}$$

The PDF can be defined as the probability density of observing a single data point x, given mean (μ) and the standard deviation (σ). Subsequently, operation 330 can provide a smoothed previous state snapshot (derived from train data) to the following operation 335 (shown in FIG. 3B).

Referring back to operation 325, if there are no additions and/or removals of new (or existing) counters (or features) with the recent release detected, then the process proceeds to operation 335 by feeding the new transition state snapshot (test data based) and the previous state snapshot (train data based) to the Anomaly Detector and Classifier (shown in FIG. 2) to detect and classify anomalies.

Next, in FIG. 3B, the process 300 moves to operation 335. In response to receiving the new transition state snapshot (test data based) and the previous state snapshot (train data based), these snapshots can be analyzed in operation 335 in order to detect anomalies and classify them (if any are detected). In the embodiments, anomalies are classified in two classes, Point and Collective. Point anomalies are consider to occur in instances where the weights or the rankings of a particular counter has changed substantially provided there has been no addition and/or removal of any counters. Collective anomalies are consider to occur when it is detected that new counters have been added, removed, or fixed to the BIOS (or firmware, OS, hardware platform, etc.). Since both point anomalies and collective anomalies affect the performance metrics defined by these specific benchmark, the new, removed, or fixed counters are evaluated in order to correctly rank the existing features (as well as newly added features) and create the new snapshot. In a brute force approach, this process can start from the initial training stage (e.g., operations 305-310) for each new release, where data is collected, then process, and applied to multiple supervised ML models in order to identify which model fits well for each benchmark. However, employing the initial training phase for release of a BIOS, for example, can require an increased amount of effort and time. Additionally, the previously spent effort from executing the initial training phase for prior releases are wasted by repeating the same phase for a subsequent release. To address this concern, the process 300 leverages smoothing the previous state snapshot (at operation 330) prior to analyzing these snapshots for detecting anomalies in operation 335, which mitigates the need to collecting train data and building ML model from scratch with every generational release.

Operation 335 can involve applying the Bayesian estimation technique, as described above, in order to detect any anomalies, and smooth the variances between the new transition state snapshot and the previous state snapshot by using a predict phase.

The predict phase of operation 335 can involve verifying the new transition state snapshot (e.g., derived from test data) with respect to the previous state snapshot (e.g., derived from the train data). Verification can be accomplished by checking whether the features' ranks and weights are within a recommended threshold. Variance model can be used for anomaly detection and a classification algorithm, which detects and classifies anomalies, can be applied if the change between the features' ranks and weights are greater than the recommended threshold.

Regarding the anomaly detection aspects of process 300, any state at a particular instance of time is defined as K and the state snapshot as X. A time series at state $K_{-n}$, $K_{-n+1}$, $K_{-n+2}$, ..., $K_1$, $K_0$ has associated snapshot $X_{-n}$, $X_{-n+1}$, $X_{-n+2}$, ..., $X_1$, $X_0$. The anomaly detector (shown in FIG. 2) can output a response $R_k \in \{0, 1\}$ indicating the output belongs to a particular predicted class. The variance model can be represented mathematically as:

$$\Delta_k = X_k - X_{k-1} \quad (3)$$

The variance model can have a threshold $\in$. Thus, the output can be represented mathematically as:

$$R_k = 1 \text{ if } \Delta_k \leq \in, 0 \text{ if } \Delta_k > \in \quad (4)$$

After the snapshots are analyzed in operation 335, this information can be used to determine whether anomalies have been detected in the BIOS of the computer system at operation 340. In general, whether anomalies are detected or not is based on whether the features' ranks and weights exceed the recommended threshold. FIG. 5 details a process 500 that can be implemented to particularly determine whether the recommended threshold has been exceeded, and in turn, whether anomalies are detected. For purposes of discussion, FIG. 5 can be considered a subprocess that occurs within operation 340.

Referring now to FIG. 5, the process 500 starts by performing a check of whether the features' weights are within the recommended threshold at operation 505. If the features' weights are determined to be within the recommended threshold ("Yes"), then this indicates that there is small variance between the new transition state and the previous state. Therefore, the process 500 moves to operation 535 which provides the resulting determination that no anomalies have been detected.

Alternatively, if operation 505 determines that the features' weights are not within the recommended threshold ("No"), then the process 500 proceeds to operation 510.

In operation 510, a check is performed to determine whether the features' ranking of current state and the previous state are the same. In the case when the rankings are determined to be the same ("Yes"), then the process 500 moves to operation 530 where the recommended threshold limits are updated. Thereafter, the process 500 determines that no anomalies have been detected at operation 535. Going back to operation 510, if the check determines that feature rankings are not the same, then the process 500 continues to 515.

At operation 515, results from the previous operations can be presented (or output) to be reviewed by a domain expert. Some aspects of process 500 involve a human to analyze the data and to make a subsequent decision. Based on a resulting human interaction, the process 500 can ultimate determine is next operation. For example, after the results are presented, in operation 520, a domain expert can analyze the features' ranking of the current state and the previous state in operation. Consequently, the check in operation 520 involves whether the domain expert decides that these results indicate that anomalies have been detected ("Yes"), which moves the process to operation 540 indicating that anomalies have been detected. Alternatively, if the domain expert decides that there are no anomalies in operation 520 ("No") then the process 500 processed to another check at operation 525. Operation 525 is a check that determines whether the recommended threshold limits should be increased.

At operation 525, if human interaction is received from the domain expert that indicates the recommended threshold limits should be increased ("Yes"), the process 500 proceeds to operation 530 to perform an update of the recommended threshold limits. Subsequently, after the update, the process 500 goes to operation 535 resulting in no detected anomalies. In the alternate case, where human interaction from the domain expert indicates that the recommended threshold limits should not be increased ("No"), then the process 500 goes straight to operation 535 without updating the recommended threshold limits. Accordingly, process 500 ultimately results in the detection of anomalies at operation 540, or a determination that no anomalies are detected at operation 535.

Returning to FIG. 3B, if operation 340 determines that anomalies have been detected in the BIOS of the computer system ("Yes"), then an indication of the detected anomalies can be presented in operation 345. The indication can be visual, such as an alert, report, notification, electronic message, graphic, and the like. In some cases, the indication can be audio, haptic, tactile, or any other additional means that serves as a notification that can be interpreted by a human. As an example, the indication that an anomaly has been detected can be displayed in a GUI to a domain expert, which allows them to address such anomalies in a manner deemed appropriate (e.g., prompting user response). Further, operation 345 can involve classifying any anomalies that have been detected. For instance, in response to detecting an anomaly, a domain expert can flag those anomalies to be classified as either point anomalies or collective anomalies. In some embodiments, classifying the detected anomalies may be automatically performed by the system.

Additionally, operation 345 can indicate any tuning recommendation that may be determined based on the generated snapshots. According to the embodiment, a best tune for each firmware release can be obtained by taking the weights and rankings from the snapshot of that particular release. Then, this best tune can be presented as a tuning recommendation for the best set of feature tuning, for example for customers and performance engineers.

Next, process 300 performs a check at operation 350 to determine the classification of a detected anomaly. In the example, operation 350 determines whether the anomaly is classified as a collective anomaly. If the anomaly is a collective anomaly, then the process 300 continues to operation 355 to enter an update phase.

At operation 355, in the case of collective anomalies, updates to the previous state snapshot (derived from the train data) can be made using the new transition state snapshot (derived from test data), thereby making the previous state snapshot more robust. The learning engine (shown in FIG. 2) may perform updating the previous state snapshot in operation 355. The learning engine can include a PDF Maximizer and an adjusted previous state snapshot. Firstly, operation 355 can include the PDF Maximizer deriving PDFs of both the states (e.g., previous and transition) from the new transition state snapshot and the previous state snapshot. Since both of the PDFs will have their own mean and standard deviation, in a graphical representation, their curves will be different.

Secondly, operation 355 can include the PDF Maximizer identifying the curve (essentially the value of mean and standard deviation) which maximizes the overlap of train data points (PDF from the previous state snapshot) with the test data points (PDF from new transition state snapshot) so that the existing train data is smoothed, and its effect on the performance metrics of the benchmarks with addition and/or removal of new (or existing) counters that have been observed with the test data (new transition state snapshot).

Maximizing the overlap of train data points (from the previous state snapshot) with the test data points (from the new transition state snapshot) focuses on minimizing the loss between the probability density of observing all individual train data points with that of test data points. The probability density of observing all individual sample points is defined as the product of probability density of observing each individual sample points. This probability density can be represented mathematically as:

$$\Pi P(x h d\ i; \mu, \sigma) \qquad (5)$$

where $x_i$ is individual sample data points and mean ($\mu$), standard deviation ($\sigma$) are from their respective State Snapshot PDFs.

The loss function can be represented mathematically as:

$$L(PSS, TSS) = \Pi P(PSS_i; \mu, \sigma) - \Pi P(TSS_i; \mu, \sigma) \qquad (6)$$

where $PSS_i$ is data points from previous state snapshot, $TSS_i$ is data points from transaction state snapshot.

This loss function essentially helps in finding the right value of the mean and standard deviation (new PDF). Once the updates to the previous state snapshot are completed, the process 300 continues to operation 360.

Subsequently, operation 360 involves generating the adjusted previous state snapshot. The adjusted previous state snapshot can be generated by training over the smoothed train data and test data generated from the above process with the same ML model applied in the initial training stage for that benchmark. In an embodiment, the predict phase and the update phases can be performed iteratively to detect and classify anomalies, until there are no collective anomalies classified in operation 350. According to the embodiments, operations 330 thru 360 can be performed iteratively. For example, once the adjusted previous state snapshot is generated in operation 360, this adjusted previous state snapshot can be fed into the recursive Bayesian estimation model. Accordingly, FIG. 3B illustrates that subsequent to operation 360, the process 300 proceeds to operation 385 which returns the adjusted previous state snapshot back to operation 330 for smoothing which is considered part of the update phase of process 300. Thus, in instances where collective anomalies are repeatedly detected, the process 300 may step through operations 330 thru 360 in an iterative manner.

In referring back to operation 340, in the case where anomalies are not detected ("No") the process 300 goes to operation 365. At operation 365, a check is performed to determine whether the prediction accuracy has been compromised. By performing the check at operation 365, the prediction accuracy can be verified again with the smoothed train data and/or test data using the same ML model which was decided in the initial training stage for that particular benchmark.

If the check determines that the accuracy is compromised at operation 365 ("Yes"), re-training is initiated in operation 370. Re-training can cause the process 300 to return to the initial training stage shown in FIG. 3A (e.g., operations 305-310). Accordingly, operation 370 can involve a re-collection of train samples from the initial training stage being initiated.

Otherwise, if the check determines that accuracy has not been compromised in operation 365 ("No"), then the process 300 goes to operation 375. At operation 375, the snapshot repository is updated. Thereafter, a new current state snapshot is generated in operation 380. The new transition state snapshot can be made into the new current state snapshot, in operation 380, until the next release of the BIOS (or firmware, hardware, OS, etc.).

Thus, the disclosed anomaly detection and tuning recommendation techniques and system enable automatic performance verification on new BIOS releases. For example, the disclosed techniques can be employed: as a replacement of the necessary verification of each BIOS option on each BIOS update (aka BIOS performance QA); verification for single and sets of BIOS options; and verification for each performance benchmark configurations. Also, the disclosed techniques provide automatic energy efficiency verification on cooling behavior, e.g., fan curves. For instance, the disclosed techniques can be employed: as a replacement of the necessary verification of each new fan curve update; verification for each energy efficiency benchmark and rating tools configurations; and verification for energy efficiency on multiple target load levels. Moreover, the techniques, as disclosed herein, can be used to determine the best BIOS settings and/or fan curves for a given configuration (e.g., Performance as a Service, Server Efficiency as a service).

Furthermore, these capabilities can be expanded for sup-optimal configuration (meaning more realistic configuration, non-optimal for benchmark results). In these situations, the customer satisfaction can be improved, as a result of a fast turnaround of the best settings or best results for the customer configuration. In some embodiments, the disclosed techniques consider performance and efficiency variance. A part-to-part variance on same SKU options (e.g., CPU, Memory, Drives, NICs, etc.) can be determined, for instance, using the disclosed techniques. In yet another application, the disclosed techniques can be applied to ascertain option performance and option configuration verification. As an example, performance issues (detect wrong memory refresh rate) can be detected, and a best performance option configuration (e.g. 1DPC vs. 2DPC, uneven memory configurations) determined. In a last practical application, the disclosed techniques can be used for detection of performance issues for multi-node systems. That is, the techniques can be leveraged to monitor performance across nodes and determine any issues.

Figure 6:
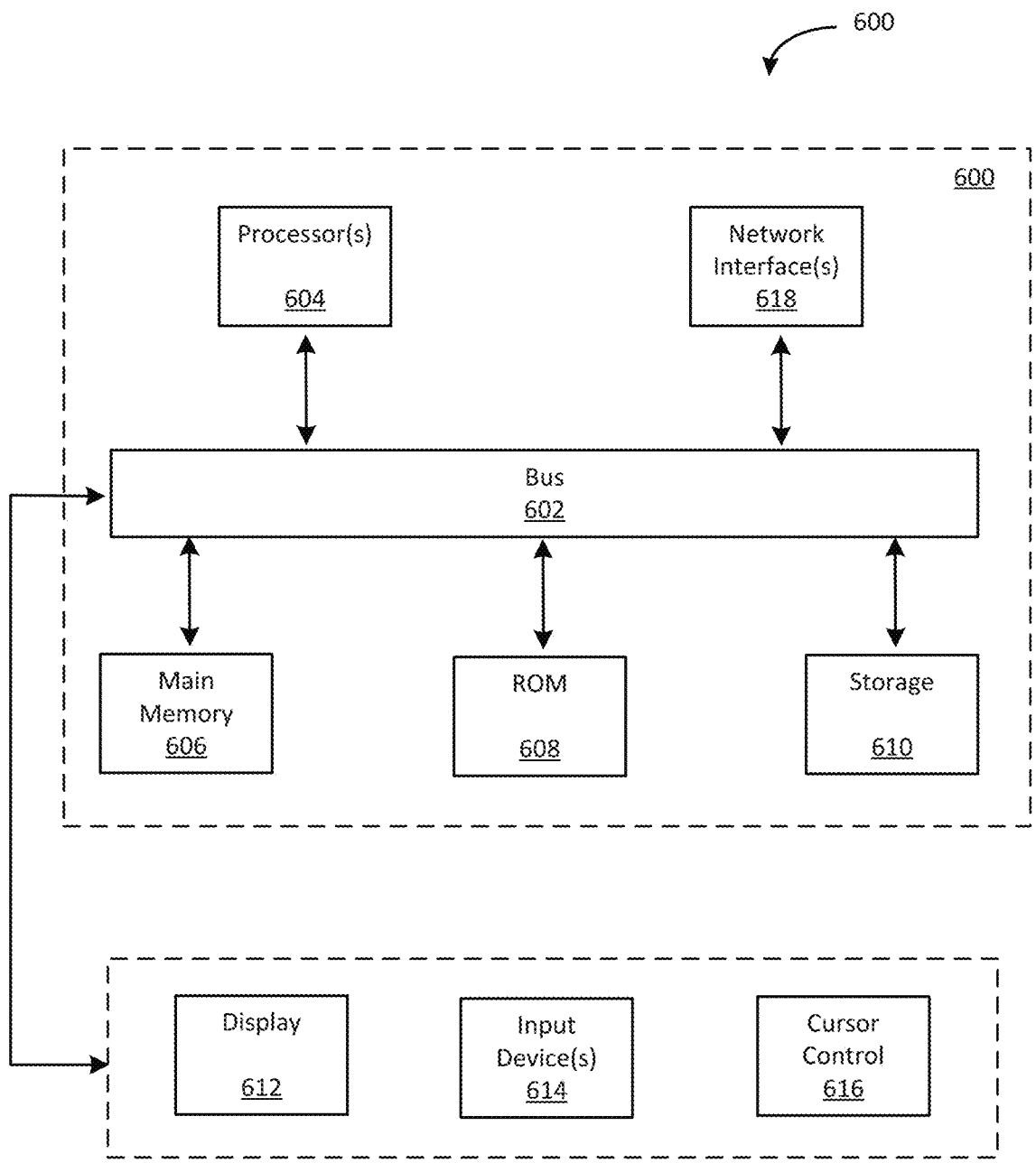
FIG. 6 depicts a block diagram of an example computer system 600 in which embodiments described herein may be implemented.

FIG. 6 is a block diagram of an example computing component or device 600 for implementing anomaly detection and tuning recommendation, in accordance with some embodiments. For example, the computing component 600 may be, a server computer implementing the anomaly detection and tuning recommendation system shown in FIG. 1. The computer component 600 may also be a controller, or any other similar computing component capable of processing data. The computer system 600 includes a bus 602 or other communication mechanism for communicating information, and one or more hardware processors 604 coupled with bus 602 for processing information. Hardware processor(s) 604 may be, for example, one or more general purpose microprocessors.

The computer system 600 also includes a main memory 608, such as a random-access memory (RAM), cache and/or other dynamic storage devices, coupled to bus 602 for storing information and instructions to be executed by processor 604. Main memory 608 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor 604 may be programmed by one or more additional instructions that may perform some or all of the functionality attributed herein to one of the instructions.

The computer system 600 further includes storage device 610. The various instructions described herein, including anomaly detection and tuning recommendation techniques, may be stored in a storage device 610, which may comprise read only memory (ROM), and/or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions. The storage device 610 may store the computer program instructions (e.g., the aforementioned instructions) to be executed by processor 604 as well as data that may be manipulated by processor 604. The storage device may comprise one or more non-transitory machine-readable storage media such as floppy disks, hard disks, optical disks, tapes, or other physical storage media for storing computer-executable instructions and/or data.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated service digital network (ISDN) card, cable modem, satellite modem, or a modem to provide a data communication connection to a corresponding type of telephone line. As another example, network interface 618 may be a local area network (LAN) card to provide a data communication connection to a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Wireless links may also be implemented. In any such implementation, network interface 618 sends and receives electrical, electromagnetic or optical signals that carry digital data streams representing various types of information. The nodes of the decentralized model building system, as disclosed herein, may be coupled to other participant nodes via the abovementioned networks.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

The various processes, methods, operations and/or data flows depicted in FIGS. 3A-3B and FIG. 5 (and in the other drawing figures) described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method to detect anomalies on multiple levels of a computer system, comprising:
   automatically obtaining train data from the computer system, wherein the train data comprises features associated with the multiple levels of the computer system that affect performance metrics defined by a selected benchmark;
   automatically applying the train data to train a plurality of machine learning (ML) models;
   creating a train snapshot corresponding to the selected benchmark based on a selected ML model from the plurality of ML models, wherein the train snapshot is associated with a previous state of the computer system;
   creating a test snapshot corresponding to the selected benchmark or workload, wherein the test snapshot is associated with a transition state of the computer system;
   detecting whether a change in the features associated with the multiple levels of the computer system occurred between the previous state of the computer system and the transition state of the computer system, wherein the change in the features comprises an addition of a new feature, a removal of a feature, or a modification of a feature that is identified based on the train snapshot associated with a previous state of the computer system and test snapshot associated with a transition state of the computer system; and
   detecting whether an anomaly is associated with each of the multiple levels of the computer system based on the train snapshot and the test snapshot.

2. The method of claim 1, wherein the detected anomaly is indicative of a discrepancy between the previous state of the computer system and the transition state of the computer system that affect performance or energy efficiency metrics defined by the selected benchmark or workload.

3. The method of claim 1, wherein the multiple levels of the computer system comprise each of the levels from a lower Basic Input/Output System (BIOS) level of the computer system to an upper application level of the computer system.

4. The method of claim 3, further comprising:
   recommending tunings for the features associated with the multiple levels of the computer system based upon the train data collected over multiple releases of the firmware and software stack.

5. The method of claim 1 further comprising:
   in response to detecting a change in the features associated with the multiple levels of the computer system, applying a recursive Bayesian estimation model to incorporate detected change in the features associated with the transition state changes to the previous state by maximizing a probability density function.

6. The method of claim 5, wherein the probability function identifies a distribution of the current state and the transition state based on weights and ranks associated with the features obtained from selected ML model.

7. The method of claim 6, wherein detecting whether an anomaly is associated with each of the multiple levels of the computer comprises:
   determining whether weights associated with the features obtained from selected ML model are within a recommended threshold;
   in response to determining that the weights are within the recommended threshold, determining that no anomaly is detected.

8. The method of claim 7, wherein detecting whether an anomaly is associated with each of the multiple levels of the computer comprises:
   in response to determining that the weights are not within the recommended threshold, determining whether previous rankings associated with the features corresponding to the previous state and current rankings associated with the features corresponding to the transition state are the same; and
   in response to determining that the previous rankings associated with the features corresponding to the previous state and current rankings associated with the features corresponding to the transition state are not the same, determining that an anomaly is detected based on a human interaction response.

9. The method of claim 1, wherein the selected ML model comprises a ML model from the plurality of the ML models that is identified as a best fit model for respective benchmarks based on the Root Mean Square Error (RMSE) value.

10. A system to detect anomalies on multiple levels of a computer system, comprising:
a computer system, wherein the computer system comprises multiple levels including a lower Basic Input/Output System (BIOS) level to an upper application level; and
an anomaly detection and tuning recommendation system communicatively coupled to the computer system, wherein the anomaly detection and tuning recommendation system is programmed to:
automatically obtain train data from the computer system, wherein the train data comprises features associated with the multiple levels of the computer system that affect performance metrics defined by a selected benchmark;
automatically apply the train data to train a plurality of machine learning (ML) models;
create a train snapshot corresponding to the selected benchmark based on a selected ML model from the plurality of ML models, wherein the train snapshot is associated with a previous state of the computer system;
create a test snapshot corresponding to the selected benchmark or workload, wherein the test snapshot is associated with a transition state of the computer system; and
detect whether an anomaly is associated with each of the multiple levels of the computer system based on the train snapshot and the test snapshot; and
generate recommended tunings for the features associated with the multiple levels of the computer system based upon the train data collected over multiple releases of the Basic Input/Output System (BIOS) level.

11. The system of claim 10, wherein the anomaly detection and tuning recommendation system is further programmed to:
automatically communicate the detected anomalies to a domain computer for further analysis and corrective actions by a user associated with the domain computer.

12. The system of claim 10, wherein the anomaly detection and tuning recommendation system is further programmed to:
automatically communicate the generated recommended tunings to a domain computer for further analysis and updates to a best set of features associated with the multiple levels of the computer system by a user associated with the domain computer.

13. A non-transitory machine-readable storage medium comprising instructions executable by a processor, the instructions programming the processor to:
automatically obtain train data from the computer system, wherein the train data comprises features associated with multiple levels of the computer system that affect performance metrics defined by a selected benchmark;
automatically apply the train data to train a plurality of machine learning (ML) models;
create a train snapshot corresponding to the selected benchmark based on a selected ML model from the plurality of ML models, wherein the train snapshot is associated with a previous state of the computer system;
create a test snapshot corresponding to the selected benchmark or workload, wherein the test snapshot is associated with a transition state of the computer system;
detect whether a change in the features associated with the multiple levels of the computer system occurred between the previous state of the computer system and the transition state of the computer system;
in response to detecting a change in the features associated with the multiple levels of the computer system, apply a recursive Bayesian estimation model to incorporate the detected change in the features associated with the transition state changes to the previous state by maximizing a probability density function; and
detect whether an anomaly is associated with each of the multiple levels of the computer system based on the train snapshot and the test snapshot.

14. The non-transitory machine-readable storage medium of claim 13, wherein the detected anomaly is indicative of a discrepancy between the previous state of the computer system and the transition state of the computer system that affect performance or energy efficiency metrics defined by the selected benchmark or workload.

15. The non-transitory machine-readable storage medium of claim 14, wherein the multiple levels of the computer system comprise each of the levels from a lower Basic Input/Output System (BIOS) level of the computer system to an upper application level of the computer system.

* * * * *